United States Patent [19]

Pietsch et al.

[11] Patent Number: 5,242,260
[45] Date of Patent: Sep. 7, 1993

[54] METHOD OF TRANSFERRING DISCRETE LIGHT SENSITIVE SHEETS FROM A DARK BOX

[75] Inventors: Gerald Pietsch, Kaufbeuren; Ernst Leithenmair, Müchen, both of Fed. Rep. of Germany

[73] Assignee: Agfa-Gevaert Aktiengesellschaft, Leverkusen, Fed. Rep. of Germany

[21] Appl. No.: 926,919

[22] Filed: Aug. 7, 1992

[30] Foreign Application Priority Data

Sep. 13, 1991 [DE] Fed. Rep. of Germany ....... 4130563

[51] Int. Cl.⁵ .............................................. B65H 3/08
[52] U.S. Cl. .................................... 414/786; 271/167; 414/411; 414/416
[58] Field of Search ............... 414/275, 404, 411, 416, 414/786; 271/167; 53/66

[56] References Cited

U.S. PATENT DOCUMENTS

| | | | |
|---|---|---|---|
| 3,675,014 | 7/1972 | Perl | 414/411 |
| 4,049,142 | 9/1977 | Azzaroni | 214/301 |
| 4,354,336 | 10/1982 | Azzaroni | 414/411 X |
| 4,506,876 | 3/1985 | Nishibori | 271/167 X |
| 4,513,558 | 4/1985 | Treiber | 53/66 X |
| 4,591,140 | 5/1986 | Illig | 271/11 |
| 4,759,679 | 7/1988 | Müller | 414/416 |
| 4,822,023 | 4/1989 | Miyoshi | 271/167 X |
| 4,823,535 | 4/1989 | Schmidt et al. | 414/416 X |
| 4,878,799 | 11/1989 | Seto et al. | 414/416 X |
| 4,887,284 | 12/1989 | Bauer et al. | 414/416 X |
| 5,052,676 | 10/1991 | Shiina et al. | 271/167 X |
| 5,052,876 | 10/1991 | Tateno et al. | 414/416 X |
| 5,109,649 | 5/1992 | Azzaroni | 414/411 X |

Primary Examiner—Michael S. Huppert
Assistant Examiner—James Keenan
Attorney, Agent, or Firm—Peter K. Kontler

[57] ABSTRACT

Discrete light sensitive exposed but undeveloped sheets which are stacked in a dark box are transferred toward or into one or more developing machines by one or more suction cups which can jointly attract a single sheet at a time or each of which can attract the uppermost sheet of one of two or more stacks of sheets in the dark box. A suction cup which attracts a portion of the uppermost sheet of a stack in the dark box is caused to flex the attracted portion above and away from the sheet below the uppermost sheet in order to promote separation of the uppermost sheet from the remainder of the stack. The flexed uppermost sheet is then at least partially extracted from the dark box and is monitored to ascertain whether or not its underside adheres to one or more sheets. If the at least partly extracted uppermost sheet carries or entrains one or more additional sheets, all extracted sheets are returned into the dark box and the procedure is started anew but the interval and/or the extent of flexing is increased to further reduce the likelihood of adherence of one or more sheets to the underside of the extracted uppermost sheet. A visible or audible signal is generated if a certain number of successive extractions of one and the same uppermost sheet still results in simultaneous extraction of two or more sheets.

14 Claims, 6 Drawing Sheets

METHOD OF TRANSFERRING DISCRETE LIGHT SENSITIVE SHEETS FROM A DARK BOX

CROSS-REFERENCE TO RELATED CASE

The dark box and the sheet withdrawing apparatus which are described and shown in the present application are identical with the dark box and the sheet withdrawing apparatus which are shown, described and claimed in the commonly owned copending patent application Ser. No. 07/926,922 filed Aug. 7, 1992 by Pietsch, Schausberger, and Vaessen for "Dark box for storage of exposed light sensitive sheets and apparatus for withdrawing sheets therefrom".

BACKGROUND OF THE INVENTION

The invention relates to the treatment of light sensitive materials in general, and more particularly to improvements in the treatment of exposed flexible light sensitive sheet-like materials which are ready to be introduced into a developing machine. Still more particularly, the invention relates to improvements in methods of manipulating sheets of flexible light sensitive material which form one or more stacks in a dark box, e.g., in a magazine, cassette or an analogous receptacle or container for temporary storage of exposed sheets of light sensitive material.

X-ray equipment is utilized in numerous fields, for example, in medicine as well as in various industries, particularly for nondestructive testing of substances, tissues, materials and/or products. Equipment which relies on X-rays employs sheets which carry coatings of radiation-sensitive material. When the exposure of a sheet to a required amount of radiation is completed, the resulting latent image must be developed in a suitable developing machine. As a rule, or in many instances, the exposed but undeveloped sheets are introduced into a dark box while the dark box is confined in a darkroom, and the dark box is closed and sealed upon introduction of a desired number of exposed sheets or when the dark box is filled to capacity. The thus closed and sealed dark box is ready to be transported to a developing machine. A dark box which is ready to be emptied is coupled to a so-called feeder which withdraws discrete sheets, one after the other, and introduces the withdrawn sheets into a developing machine.

Sheets which are coated with radiation sensitive material are likely to exhibit, at least at times, a more or less pronounced tendency to adhere to each other. This creates problems when a feeder is called upon to withdraw single sheets, i.e., to withdraw successive uppermost or topmost sheets of a pile or stack of superimposed sheets. The situation is often aggravated due to the fact that the sheets are stacked in a dark box. Attempts to overcome the just outlined problem, i.e., to more reliably segregate successive uppermost sheets of a stack from the sheets immediately below them, include the utilization of suction cups which are caused to slightly flex portions of the uppermost sheets so that the tendency of neighboring sheets to adhere to each other is reduced or eliminated and the uppermost sheet can be readily extracted from the dark box. In most instances, such flexing of portions of uppermost sheets of a stack of radiation-sensitive sheets suffices to ensure that the feeder can admit into a developing machine discrete radiation sensitive sheets which carry latent images and are ready to be treated in a conventional manner, e.g., by causing them to pass through a series of baths prior to entering a drying chamber. In order to further enhance the likelihood of separation of each uppermost sheet from the sheet or sheets immediately therebelow, certain presently known feeders are designed in such a way that the suction cup or suction cups maintain the attracted portion of the uppermost flexible sheet in flexed condition for a certain interval of time which should suffice to ensure separation of the next-to-the-uppermost sheet from the flexed portion of the uppermost sheet. The aforementioned interval is variable to take into consideration the differences between various sheets and/or various formats of sheets. Such versatility of the feeder further enhances the likelihood of reliable separation of successive uppermost sheets of a stack of sheets from the immediately following sheets.

In accordance with a further proposal, apparatus which are used to transfer flexible sheets of exposed radiation sensitive material from a magazine or cassette into a developing machine are provided with means for monitoring successive extracted uppermost sheets in order to ascertain whether or not each extracted sheet has been extracted alone. If the monitoring system detects simultaneous extraction of two or more coherent sheets, such coherent sheets are returned into the magazine or cassette and the extracting or withdrawing procedure is repeated.

OBJECTS OF THE INVENTION

An object of the invention is to provide a dark box which contains one or more stacks of superimposed (overlapping) exposed but undeveloped light sensitive sheets.

Another object of the invention is to provide a method which renders it possible to reliably extract discrete uppermost or topmost sheets from each stack of superimposed sheets in the dark box.

A further object of the invention is to provide a method which renders it possible to rapidly empty the contents of a dark box.

An additional object of the invention is to provide a method which facilitates separation of coherent sheets during extraction from a dark box.

Still another object of the invention is to provide a method which renders it possible to enhance the effectiveness of separation of successive uppermost sheets of a stack of overlapping sheets if the first attempt at extraction of a discrete uppermost sheet fails to result in extraction of a single sheet.

A further object of the invention is to provide a novel and improved method of intensifying the separation of an overlapping sheet from the overlapped sheet in a stack of sheets if the initial separation attempt or attempts remain unsuccessful.

Another object of the invention is to provide a novel and improved method of conveying exposed but undeveloped light sensitive sheets into one or more developing machines.

An additional object of the invention is to provide a novel and improved method of arraying exposed but undeveloped light sensitive sheets upon extraction of such sheets from a dark box.

Still another object of the invention is to provide a method which renders it possible to treat light sensitive sheets gently even if at least some of the sheets must be repeatedly introduced into and extracted from a dark box.

A further object of the invention is to provide a novel and improved method of rapidly evacuating the contents of a dark box which contains two or more stacks of superimposed identical or different exposed but undeveloped light sensitive sheets.

An additional object of the invention is to provide a novel and improved method of monitoring extracted sheets of light sensitive material.

Another object of the invention is to provide a method which is sufficiently reliable to ensure that a dark box must be opened in a darkroom by hand only in certain very infrequent instances, for example, when one attached to the neighboring sheets for another reason.

Still another object of the invention is to enhance the reliability of a method which involves repeated extraction of certain sheets from the dark box.

A further object of the invention is to provide a method which can be practiced in connection with sheets of many different formats with the same degree of reliability.

An additional object of the invention is to provide a method which can be practiced by resorting to relatively simple, compact and inexpensive apparatus.

Another object of the invention is to provide a method which can be practiced for introduction of sheets of any desired format into all or nearly all available developing machines.

A further object of the invention is to provide a method which can be automated to a desired extent and which can be practiced in existing processing laboratories for X-ray films, other types of films and/or photographic paper.

An additional object of the invention is to provide a method which renders it possible to expedite the introduction of sheets into a developing machine so that the machine can be used to capacity.

SUMMARY OF THE INVENTION

One feature of the present invention resides in the provision of a method of withdrawing flexible light sensitive sheets from a dark box wherein the sheets form at least one stack of superimposed sheets including an uppermost sheet and wherein at least one sheet beneath the uppermost sheet tends to adhere, at times, to the uppermost sheet. The method comprises the steps of attracting a selected portion of the uppermost sheet by suction to at least one pneumatic lifting device (e.g., a device employing one or more suction cups), at least slightly flexing the attracted selected portion of the uppermost sheet above and away from the remainder of the stack for a first interval of time to thus promote separation of the uppermost sheet from the sheet beneath the uppermost sheet, at least partially extracting the thus attracted and flexed uppermost sheet from the dark box, monitoring the extracted uppermost sheet for the presence of one or more sheets which adhere to the extracted uppermost sheet, returning the extracted uppermost sheet and the adhering one or more sheets beneath the uppermost sheet into the dark box upon detection of one or more adhering sheets, attracting a selected portion of the returned uppermost sheet by suction to the at least one pneumatic lifting device, thereupon flexing the attracted selected portion of the returned uppermost sheet above and away from the remainder of the at least one stack for a different (preferably longer) second interval of time, and thereupon at least partially extracting the twice flexed uppermost sheet from the dark box. For example, the duration of the second interval of time can be at least approximately twice the duration of the first interval.

The method can further comprise monitoring the twice extracted uppermost sheet for the presence of one or more sheets which adhere to the twice extracted uppermost sheet, returning the twice extracted uppermost sheet and the adhering one or more sheets into the dark box upon detection of one or more adhering sheets, attracting a portion of the twice returned uppermost sheet by suction to the at least one pneumatic lifting device, thereupon flexing the thrice attracted portion of the uppermost sheet above and away from the remainder of the at least one stack (e.g., for an interval of time whose duration matches that of the first or second interval or whose duration departs from (particularly exceeds) the duration of each preceding interval), and thereupon extracting the thrice flexed uppermost sheet from the dark box.

The method can further comprise the steps of monitoring the thrice extracted uppermost sheet for the presence of one or more sheets which adhere to the thrice extracted uppermost sheet, and generating a detectable (optical and/or acoustic and/or other) signal upon detection of one or more sheets adhering to the thrice extracted uppermost sheet. The signal generating step can be carried out earlier, e.g., upon completion of the second monitoring step; however, it is presently preferred to carry out at least three monitoring steps prior to the signal generating step.

The first flexing step can include flexing the attracted portion of the uppermost sheet to a first extent, and the second flexing step can comprise flexing the attracted portion of the uppermost sheet to a different second extent, preferably to a second extent greater than the first extent.

If the improved method is resorted to for withdrawal of flexible light sensitive sheets from a dark box wherein the sheets form at least two stacks of superimposed sheets and each stack includes an uppermost sheet and at least one sheet beneath the uppermost sheet to the respective uppermost sheet, the first attracting step of the method includes attracting at least a portion of the uppermost sheet of each stack by at least one discrete pneumatic lifting device, the first flexing step comprises simultaneously flexing the attracted portions of the uppermost sheets above and away from the remainders of the respective stacks for a first interval of time and/or to a first extent to thus promote separation of the uppermost sheets from the sheets beneath the respective uppermost sheets, and the first extracting step includes extracting the thus flexed uppermost sheets from the dark box, either entirely or in part. The monitoring step of such method comprises monitoring the extracted uppermost sheets for the presence of one or more sheets which adhere to the attracted uppermost sheets, the returning step includes returning the extracted uppermost sheets and the adhering one or more sheets into the dark box upon detection of one or more adhering sheets, the second attracting step includes attracting at least a portion of each returned uppermost sheet by the respective at least one discrete pneumatic lifting device, the second flexing step includes flexing the attracted portion of each returned uppermost sheet above and away from the remainder of the respective stack for a longer second interval of time and/or to a different second extent, and the second extracting step comprises extracting each twice flexed uppermost sheet from the dark box.

The method can further comprise the step of introducing the twice flexed uppermost sheet into a developing machine.

Another feature of the invention resides in the provision of a method of withdrawing flexible light sensitive sheets from a dark box (e.g., a magazine or cassette) wherein the sheets form at least one stack of superimposed sheets including an uppermost sheet and wherein at least one sheet beneath the uppermost sheet tends, at times, to adhere to the uppermost sheet. This method comprises the steps of attracting a portion of the uppermost sheet by suction to at least one pneumatic lifting device, flexing the attracted portion of the uppermost sheet above and away from the remainder of the stack to a first extent to thus promote separation of the uppermost sheet from the sheet beneath the uppermost sheet, at least partially extracting the thus attracted and flexed uppermost sheet from the dark box, monitoring the extracted uppermost sheet for the presence of one or more sheets which adhere to the extracted uppermost sheet, returning the extracted uppermost sheet upon detection of one or more adhering sheets, attracting a portion of the returned uppermost sheet by suction to the at least one pneumatic lifting device, thereupon flexing the attracted portion of the returned uppermost sheet above and away from the remainder of the stack to a different second extent, and thereupon at least partially extracting the twice flexed uppermost sheet from the dark box. The step of flexing the attracted portion of the returned uppermost sheet can include flexing the uppermost sheet to a second extent greater than the first extent.

If the sheets in the dark box form at least two stacks of superimposed sheets, the first attracting step includes attracting at least a portion of the uppermost sheet of each stack by at least one discrete pneumatic lifting device, the first flexing step comprises simultaneously flexing the attracted portions of the uppermost sheets above and away from the remainders of the respective stacks to a first extent to thus promote separation of the uppermost sheets from the sheets beneath the respective uppermost sheets, the first extracting step includes at least partially extracting the thus flexed uppermost sheets from the dark box, and the monitoring step includes monitoring the at least partially extracted uppermost sheets for the presence of one or more sheets which adhere to the extracted uppermost sheets. The returning step then includes returning the extracted uppermost sheets and the adhering one or more sheets into the dark box upon detection of one or more adhering sheets, the second attracting step includes attracting a portion of each returned uppermost sheet by the respective at least one discrete pneumatic lifting device, the second flexing step includes flexing the attracted portion of each returned uppermost sheet above and away from the remainder of the respective stack to a different second extent, and the second extracting step includes at least partially extracting each twice flexed uppermost sheet from the dark box. The second flexing step can include flexing the attracted portion of each returned uppermost sheet to a second extent greater than the first extent.

The novel features which are considered as characteristic of the invention are set forth in particular in the appended claims. The improved method itself, however, will be best understood upon perusal of the following detailed description of certain presently preferred specific embodiments with reference to the accompanying drawing.

BRIEF DESCRIPTION OF THE DRAWING

FIG. 3c is an enlarged perspective view of a detail in FIG. 3a;

DESCRIPTION OF PREFERRED EMBODIMENTS

Figure 1:
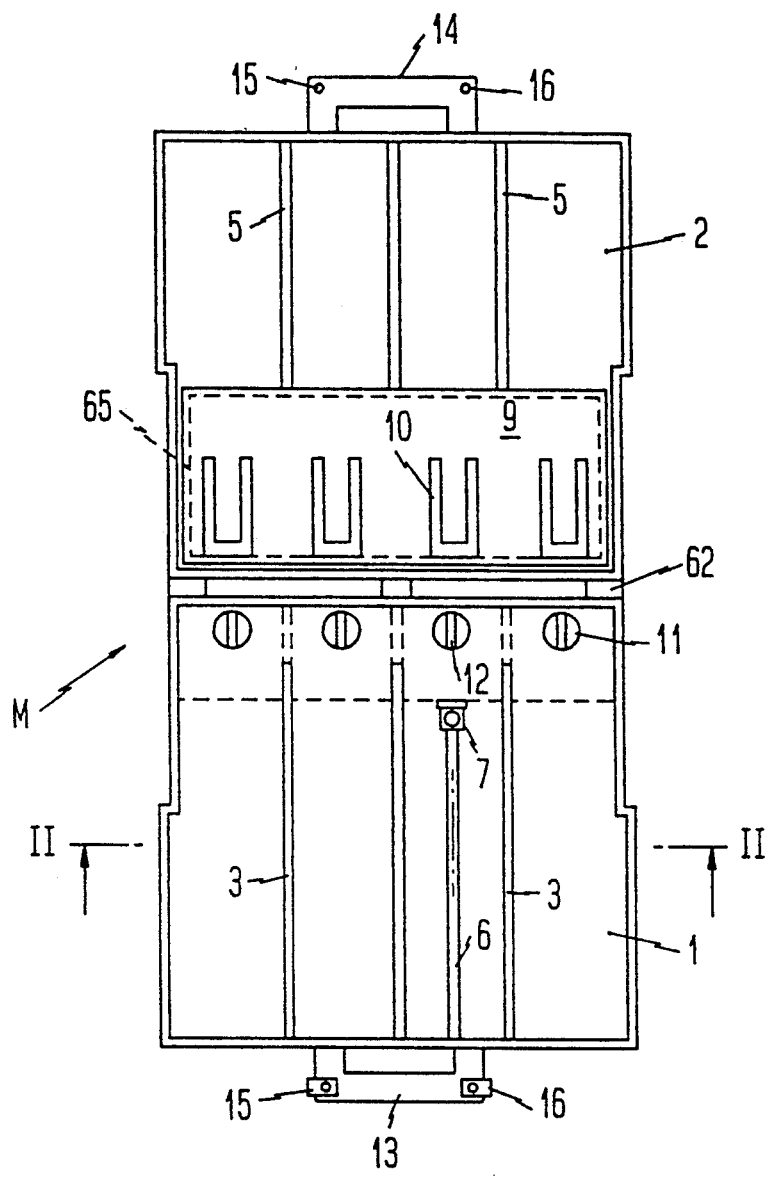
FIG. 1 is a schematic plan view of a dark box for temporary storage of one or more stacks of flexible light sensitive sheets, one section of the housing of the dark box being shown in the open position.
Figure 2:
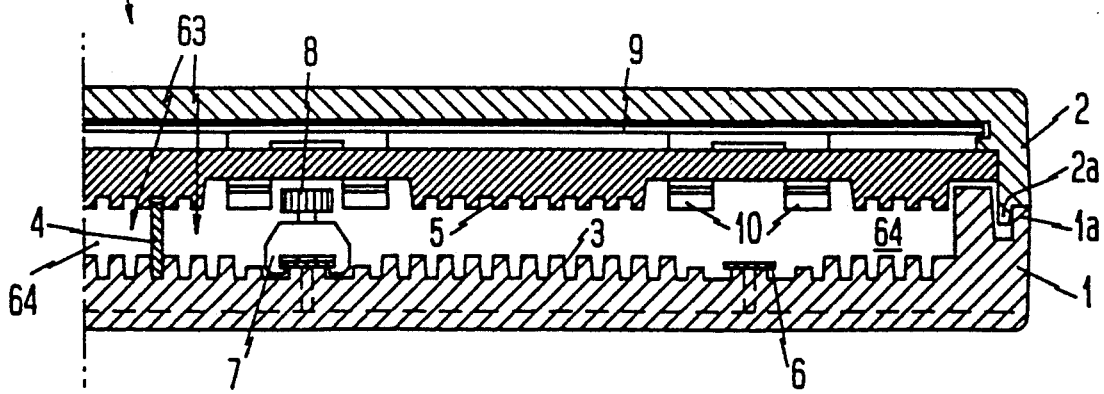
FIG. 2 is an enlarged fragmentary transverse sectional view of the dark box, with another section of the housing shown in the closed position.

Referring first to FIGS. 1 and 2, there is shown a dark box M in the form of a relatively flat and substantially square or rectangular cassette or magazine for storage of piles or stacks 61 of sheets 60, 60a . . . (FIGS. 3a and 3b) of exposed but yet to be developed light sensitive material. The dark box M comprises a housing including a first or bottom section 1, a second or top section 2, and means (e.g., a hinge 62) for pivotally coupling the second section 2 to the first section 1 so that the section 2 is movable between an open position shown in FIG. 1 and a closed position which is shown in FIG. 2.

The inner side of the first section 1 is formed with a plurality of recesses in the form of elongated at least substantially parallel grooves 3, and the inner side of the second section 2 is also formed with a plurality of elongated at least substantially parallel recesses in the form of grooves 5. FIG. 1 merely shows three parallel grooves 3 and three parallel grooves 5 each of which is aligned with one of the grooves 3. The grooves 3 and 5 can removably receive the respective marginal portions of elongated partitions 4 (one shown in FIG. 2) which serve to divide the internal chamber 63 of the housing of the dark box M into a number of variable-capacity compartments 64 (two shown in FIG. 2). The partitions 4 can be transferred from first selected pairs into second selected pairs of aligned grooves 3, 5 in order to change the capacities of the neighboring compartments 64 in dependency on the formats of sheets 60, 60a . . . which are to be temporarily confined therein.

The partitions 4 constitute one set of parts for dividing the internal chamber 63 into compartments 64 of selected capacities. Such dividing means further comprises one or more walls 7 (only one shown in FIGS. 1 and 2) which are movable longitudinally of the adjacent grooves in order to select the effective length of the respective compartments 64. FIG. 1 and 2 show that the wall or walls 7 are installed in the first section 1 of the housing; each such wall is movable longitudinally of an elongated guide rail 6 between a pair of neighboring grooves 3, and each wall 7 can be separably secured to the first section 1 by at least one screw 8 or another suitable fastener. If the inner sides of the housing sections 1 and 2 are provided with only three grooves (3, 5) each, the internal chamber 63 can be subdivided into four compartments 64 which may but need not have identical widths (depending on the distribution of grooves 3 and of the aligned grooves 5) and the length of each of which is preferably variable by a discrete mobile wall 7. The depth of each compartment 64 is or can be such that each of these compartments can receive a pile or stack 61 of two, three or more superimposed sheets 60, 60a . . . having a particular format.

If the dark box M of FIGS. 1 and 2 is to store larger sheets, one or more or all partitions 4 are removed and/or shifted into different grooves 3 and/or 5, and the walls 7 are moved out of the way or shifted along the respective guide rails 6 to different positions to permit the establishment of one or more compartments 64 having a desired size (length and width) for one or more selected formats of flexible light sensitive sheets 60. For example, all of the partitions 4 can be removed to provide a single compartment 64 whose size matches or is less than that of the internal chamber 63, depending upon whether the wall or walls 7 are used to limit the length of the single compartment as seen in the longitudinal direction of the grooves 3 and 5. It is equally possible to distribute the parts 4 and 7 of the adjustable dividing means in such a way that the housing including the sections 1, 2 defines two, three or five or more compartments 64, depending on the formats of sheets 60 to be temporarily confined therein.

FIG. 2 shows that the head of the illustrated fastener 8 is spaced apart from the adjacent portion of the inner side of the second or top housing section 2 when the latter is caused to assume the closed or sealing position. In order to prevent the topmost sheet or sheets 60 in the adjacent compartments 64 from migrating along the inner side of the section 2 over the head of the illustrated fastener 8, the section 2 preferably supports a set of substantially U-shaped hold down devices 10 which can bear against the topmost sheets 60 in the adjacent compartments 64 to thus prevent any undesirable shifting of confined sheets when the section 2 has been pivoted to the closed or sealing position of FIG. 2. The provision of hold down devices 10 is particularly desirable when the sheets 60 in the neighboring compartments 64 are relatively small and/or when the closed dark box M is treated by inexperienced persons. The hold down devices 10 can be biased toward the inner side of the housing section 1 by suitable springs (not shown) to even further reduce the likelihood of uncontrolled shifting of confined sheets over the heads of the fasteners 8.

The second housing section 2 is provided with an opening 65 (indicated in FIG. 1 by broken lines) which can be closed and sealed by a substantially panel-like member or door 9 which is slidable in suitable ways (not specifically shown) of the section 2 between a first position in which the opening 65 is exposed and a second position in which the opening 65 is closed and sealed against penetration of radiation which could affect the quality of latent images on the sheets in their compartments 64. The aforementioned hold down devices 10 are or can be provided on the sealing-exposing member 9.

The opening 65 establishes one of two available paths for introduction of sheets into or for withdrawal of sheets from their respective compartments 64. The other path is established by the opening which develops when the second housing section 2 is pivoted from the closed position of FIG. 2 to the open position of FIG. 1.

The first housing section 1 is further provided with several (FIG. 1 shows four) circular depressions or sockets 11 which extend from the inner side toward but short of the outer side of the section 1 and each of which communicates with a slit-shaped passage 12 extending all the way to the outer side of the section 1. The purpose of the depressions 11 and of the associated slit-shaped passages 12 is to permit suction cups 25 (FIGS. 3a, 3b, 3c) or analogous sheet lifting devices of the sheet attracting, extracting, transferring and returning apparatus to draw atmospheric air when the adjacent portions of the respective compartments 64 do not contain any sheets. Thus, the depressions 11 and the passages 12 can be said to constitute component parts of means for monitoring the dark box M for the presence of sheets in the compartments 64. The suction cups 25 can extend all the way into the respective depressions 11 so that they draw air only from the atmosphere (through the respective passages 12 which, as already mentioned above, extend all the way to the outer side of the housing section 1). The pressure in the suction cups 25 is ascertained by a pressure sensing unit which is installed in or is associated with an evaluating or control unit 35 (FIGS. 3a and 3b) of the monitoring means forming part of the sheet attracting, flexing, extracting, transferring and returning apparatus.

Figure 3A:
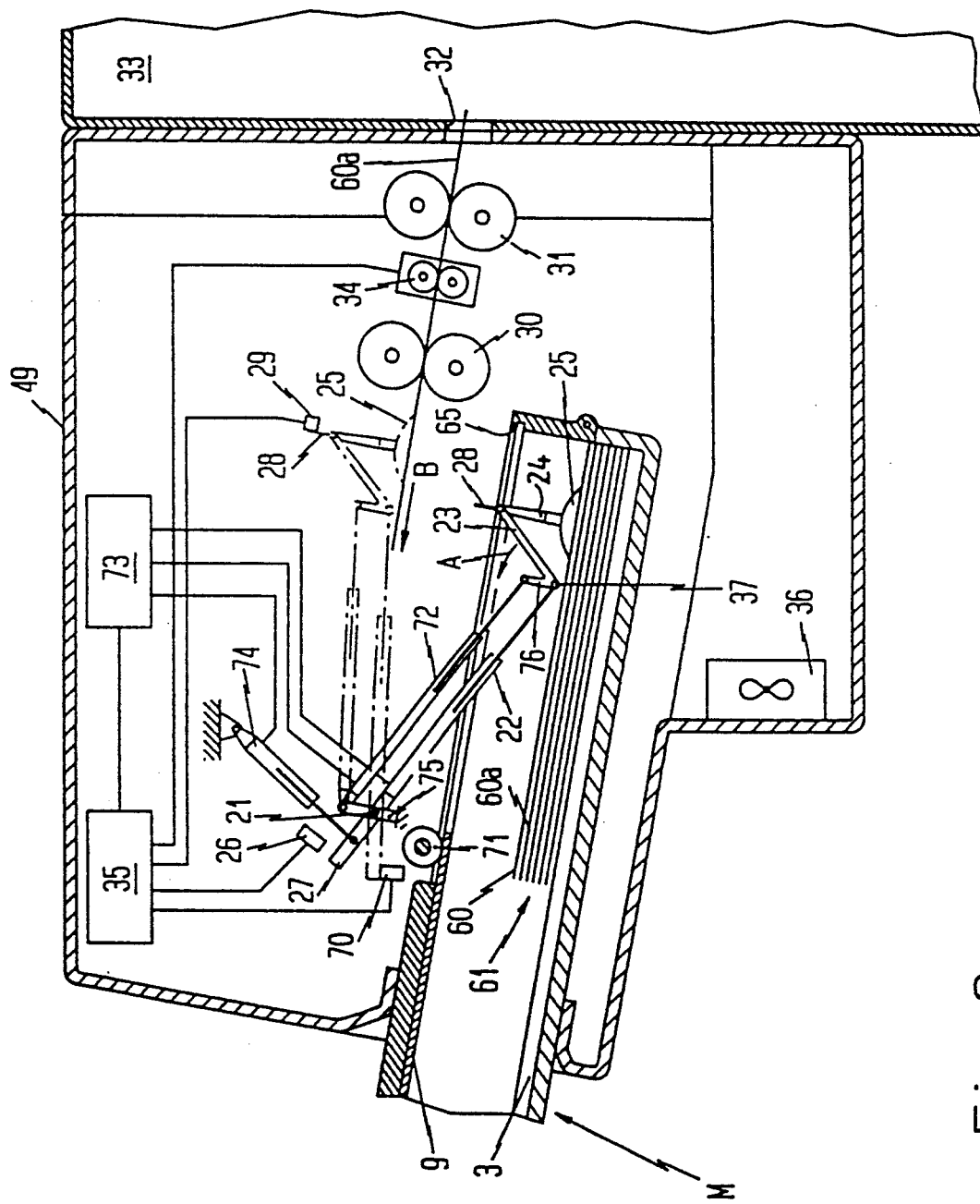
FIG. 3a is a schematic partly elevational and partly sectional view of an apparatus which is utilized to transfer sheets of different formats from a dark box into one or more developing machines.
Figure 3B:
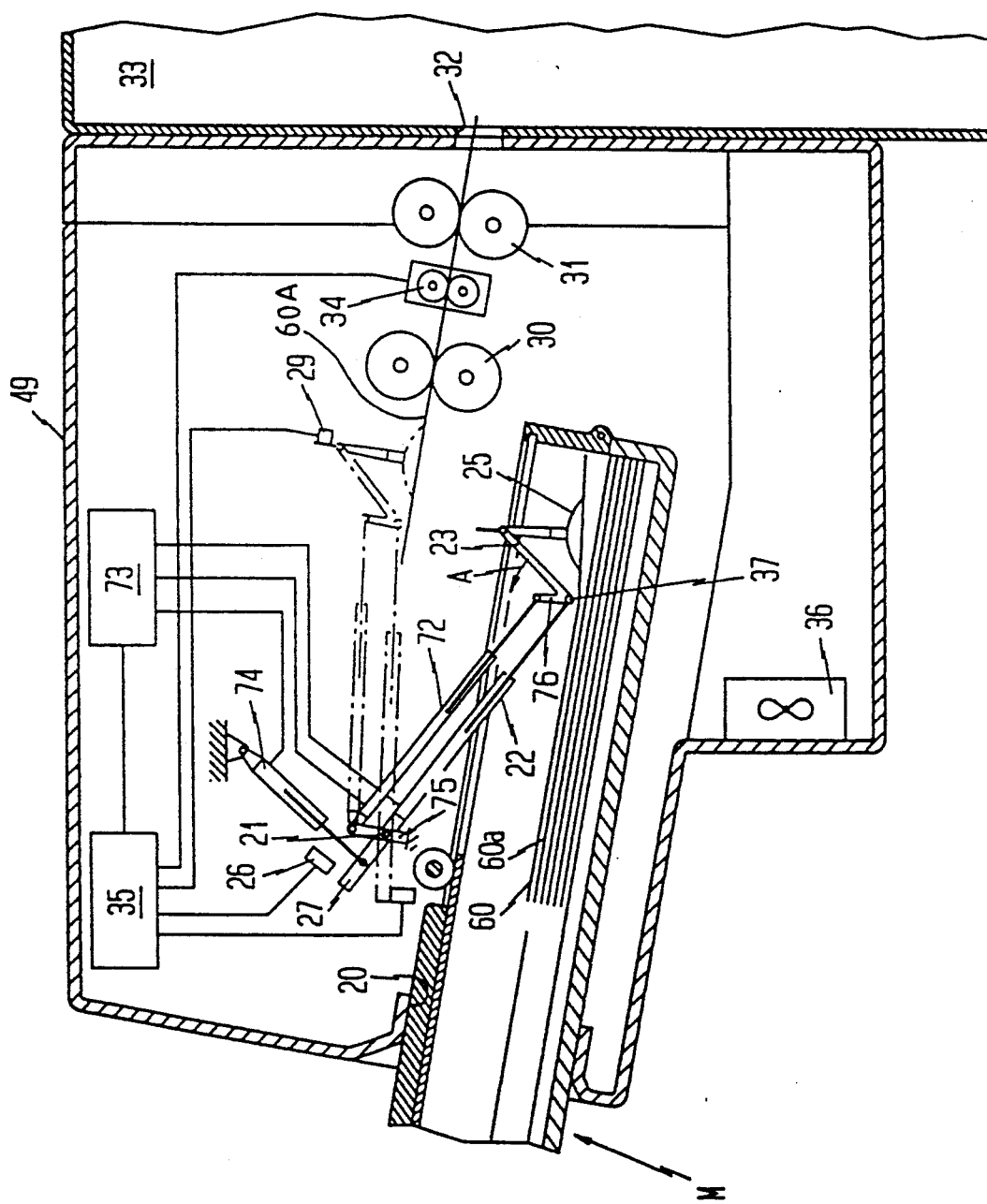
FIG. 3b shows the structure of FIG. 3a but with the suction cups in different angular positions.

The sections 1 and 2 of the housing of the dark box M are further provided with discrete U-shaped handles 13 and 14, respectively. Each of these handles carries two independently operable locking or closing elements 15, 16. The locking elements 15, 16 of the handle 13 can cooperate with similarly referenced locking elements of the handle 14 to maintain the second housing section 2 in the closed position of FIG. 2. This reduces the likelihood of accidental opening of the dark box M, e.g., during introduction into a darkroom or enclosure 49 which is shown in FIGS. 3a and 3b and forms part of the aforementioned sheet manipulating apparatus. The housing sections 1 and 2 can be made of any suitable material which prevents penetration of radiation into the chamber 63 when the section 2 is maintained in the closed position of FIG. 2 and the slidable exposing-sealing member 9 is maintained in the operative position of FIG. 1.

FIG. 2 shows that the housing sections 1 and 2 comprise sealing portions 1a, 2a which cooperate to prevent the penetration of radiation into the chamber 63 when the section 2 is maintained in the closed position.

An important advantage of the improved dark box M is that it can be rapidly converted for storage of a single stack 61, for storage of two stacks having sheets of identical size and shape or differently dimensioned and/or configurated sheets, or for storage of three or more stacks of identical or different sheets. Thus, if all of the partitions 4 are removed and the walls 7 are pushed out of the way or removed, the internal chamber 63 of the dark box M is ready to receive a single stack 61 of relatively large sheets 60. If a single partition is placed midway between the sidewalls of the housing sections 1, 2, the internal chamber 63 is divided into two equal compartments 64 each of which can receive a stack 61 of sheets 60. Other simple manipulations of the partition or partitions 4 and/or walls 7 will be carried out in order to provide three or more compartments 64 of desired size and shape.

The provision of grooves 3 in the inner side of the housing section 1 or the provision of grooves 5 in the inner side of the housing section 2 is optional, i.e., each partition 4 which is put to use to subdivide the chamber 63 can extend into a single groove 5 or into a single groove 3. The provision of grooves 3, 5 in each of the two housing sections 1, 2 is preferred at this time because, if a partition extends into a pair of aligned grooves 3 and 5, it is more likely to establish a combined light barrier and sheet-confining barrier all the way between two neighboring compartments 64.

The dimensions of the housing section 2 may but need not match the dimensions of the housing section 1. Furthermore, the hinge 62 can be replaced with other suitable means for movably coupling the sections 1 and 2 to each other. A hinge 62 is preferred at this time because it enables the person in charge to move the section 1 or 2 to the fully open position of FIG. 1 and to thus facilitate introduction of stacks 61 of sheets 60 into the compartment or compartments of the dark box M. The opening which develops in response to opening of the dark box M in a manner as shown in FIG. 1 can also serve for evacuation of sheets 60 from their compartment or compartments 64; however, it is normally preferred to provide the aforediscussed panel-like slidable member 9 which can seal the opening 65, i.e., to provide a separate opening for withdrawal of sheets 60. This ensures that the dark box M need not be fully opened upon introduction into the opening 20 of the enclosure 49 in the manipulating apparatus of FIGS. 3a and 3b. Moreover, it is simpler to automatically shift the member 9 to the open position, particularly in response to introduction of a certain portion of the closed dark box M into the inlet opening 20 of the enclosure 49.

The darkroom or enclosure 49 of the sheet manipulating apparatus which is shown in FIGS. 3a and 3b has the afore-mentioned inlet opening 20 for introduction of an at least partially filled dark box M. This apparatus further comprises means (such as a rubber-coated friction wheel or roller 71 of FIGS. 3a and 3b) for automatically moving the slidable closing-exposing member or door 9 to the open position in response to insertion of a certain portion of the dark box M into the internal space of the enclosure 49. Reference may be had to U.S. Pat. No. 4,049,142 granted Sep. 20, 1977 to Azzaroni. The roller 71 automatically shifts the cover 9 to open position in response to introduction of the dark box M into the opening 20. The means for simultaneously withdrawing two or more sheets 60 from the respective compartments 64 of the dark box M whose housing has been partially introduced into the enclosure 49 through the inlet opening 20 includes a linkage for the battery of (e.g., four) pneumatic lifting devices in the form of suction cups 25. Such linkage includes two elongated members 22 (e.g., pneumatic cylinder and piston units—see particularly FIG. 3c which are pivotable about the horizontal axes 21 and each of which is preferably of variable length. Each of the illustrated members or units 22 comprises a plurality of portions which are telescoped into each other so that they can select the distance of the suction cups 25 from the shafts 21. Each member or unit 22 carries at its free end (namely the end which is distant from the respective shaft 21) a lever 23 which is pivotable in and counter to the direction indicated by arrow A. One end of each lever 23 is articulately connected to the respective member or unit 22, and the other ends of these levers carry a rod-like support 24 for the battery of suction cups 25. As concerns the movements of suction cups 25 relative to the adjacent sheets 60, reference may be had again to U.S. Pat. No. 4,049,142 to Azzaroni as well as to commonly owned U.S. Pat. No. 4,591,140 granted May 27, 1986 to Illig et al. The means for raising and lowering the suction cups 25 includes pneumatic cylinder and piston units 74. The means for preventing the suction cups 25 from changing their orientation during movement between the solid-line and phantom-line positions of FIGS. 3a and 3b comprises a parallel motion mechanism including the rod-shaped members or units 22, cylinder and piston units 72, rigidly mounted connecting members 75 and the arms 76 of the levers 23. Thus, the undersides of the suction cups 25 are normally parallel to the sheets 60 in the respective compartments 64. The cylinder and piston units 72 serve to change the orientation of the suction cups 25 (compare the solid-line positions of the suction cup 25 which is shown in FIGS. 3a and 3b) in order to enhance separation of the respective topmost sheet 60 from the sheet 60a therebelow.

The means for monitoring the withdrawal of sheets 60 from the respective compartments 64 and the advancement of withdrawn sheets toward the inlet 32 of the illustrated single developing machine 33 (i.e., toward the outlet of the enclosure 49) comprises a trip 27 which is provided on at least one of the members 22 and can actuate a microswitch 26 serving to transmit signals to the control unit 35 of the monitoring means. Furthermore, at least one suction cup 25 carries an extension or trip 28 which also forms part of the monitoring means and can actuate a microswitch 29 serving to transmit signals to the control unit 35.

The means for conveying freshly withdrawn sheets 60 from the suction cups 25 toward and into the inlet 32 of the developing machine 33 comprises several pairs of advancing rolls (FIGS. 3a and 3b show two pairs 30, 31) which define an elongated path extending from the suction cups 25 (when these suction cups assume the phantom-line positions of FIGS. 3a and 3b) to the inlet 32.

Figure 6:
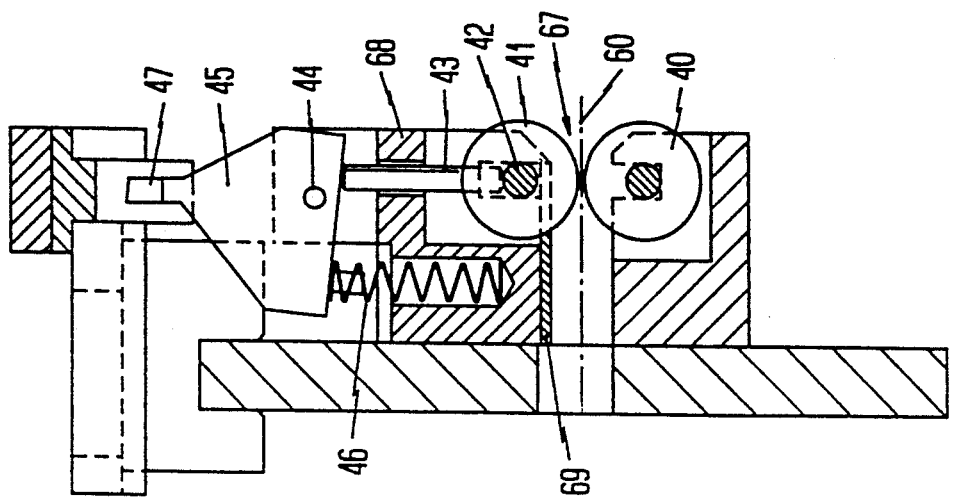
FIG. 6 is a sectional view substantially as seen in the direction of arrows from the line VI—VI in FIG. 5.
Figure 5:
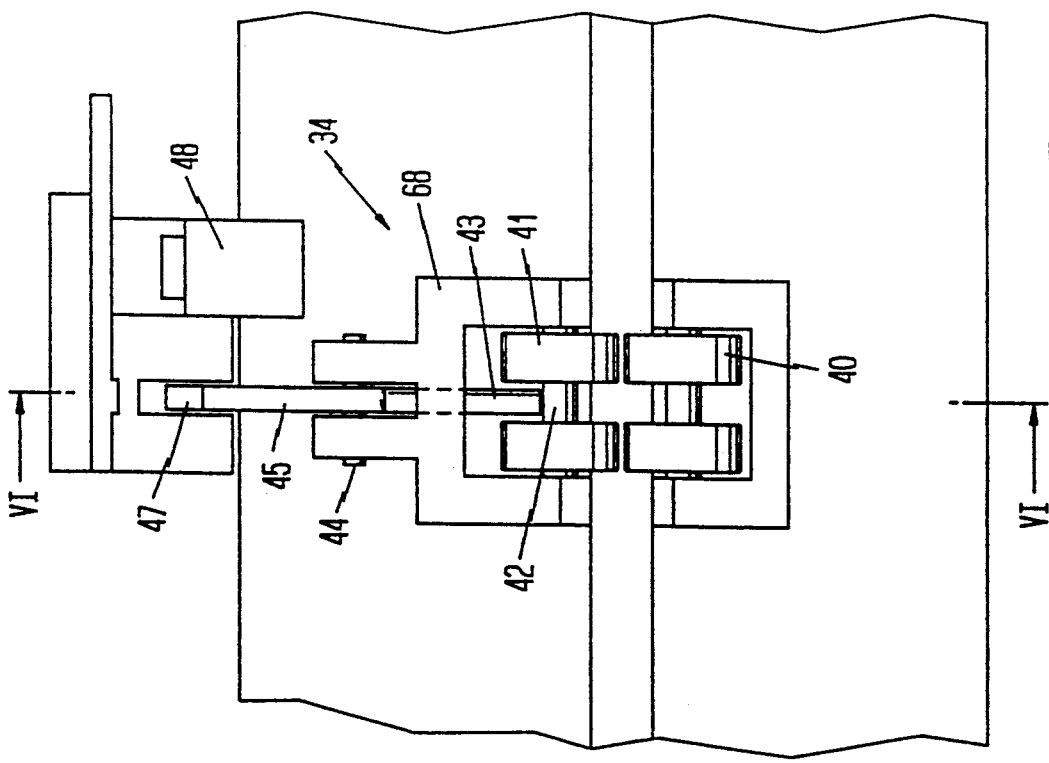
FIG. 5 is a front elevational view of certain component parts of means for monitoring the numbers of withdrawn sheets in the apparatus of FIGS. 3a-3c or FIG. 4.

The monitoring means of the apparatus which is shown in FIGS. 3a and 3b further comprises means 34 for ascertaining or counting the number of overlapping or partly overlapping sheets 60 which are being advanced along the aforementioned path toward and into the inlet 32 of the developing machine 33. The details of presently preferred ascertaining or counting means 34 are shown in FIGS. 5 and 6. One such ascertaining or counting means 34 is or can be provided for each suction cup 25.

Referring now to FIGS. 5 and 6, the ascertaining or counting means 34 which is shown therein comprises two pairs of rollers 40, 41 or analogous rotary members which define a nip 67 for sheets 60A, 60, 60a . . . , namely for those sheets which advance along the path defined by the pairs of advancing rolls 30 and 31. The rollers 40, 41 are disposed at opposite sides of the path for the sheets, and the rollers 40 of the lower pair are idler rollers which are rotatable about a fixed common horizontal axis. The upper rollers 41 are rotatable about a horizontal shaft 42 which is journalled in a mobile frame 68, and the latter is biased against a stop 69 by one or more coil springs 46 so that the rollers 41 tend to reduce the width of the nip 67 to a minimum value, e.g., zero.

The spring 46 which is shown in FIG. 6 further serves to bias a lever 45 in a clockwise direction so that the shorter arm of this lever bears against a pin 43 which is reciprocably mounted in the frame 68 and shares the movements of the rollers 41 toward and away from the rollers 40. The longer arm 47 of the lever 45 (which is fulcrumed at 44) cooperates with a photoelectronic scanning device 48 (e.g., a standard light barrier of the type known as TLP 1019 distributed by Toshiba) which transmits to the control unit 35 signals denoting the level of the rollers 41, i.e., the number of overlapping or partly overlapping sheets 60, 60a . . . in the nip 67. FIG. 6 shows the rollers 41 in their optimal positions, i.e., the number of sheets 60 in the nip 67 is one.

Figure 3C:
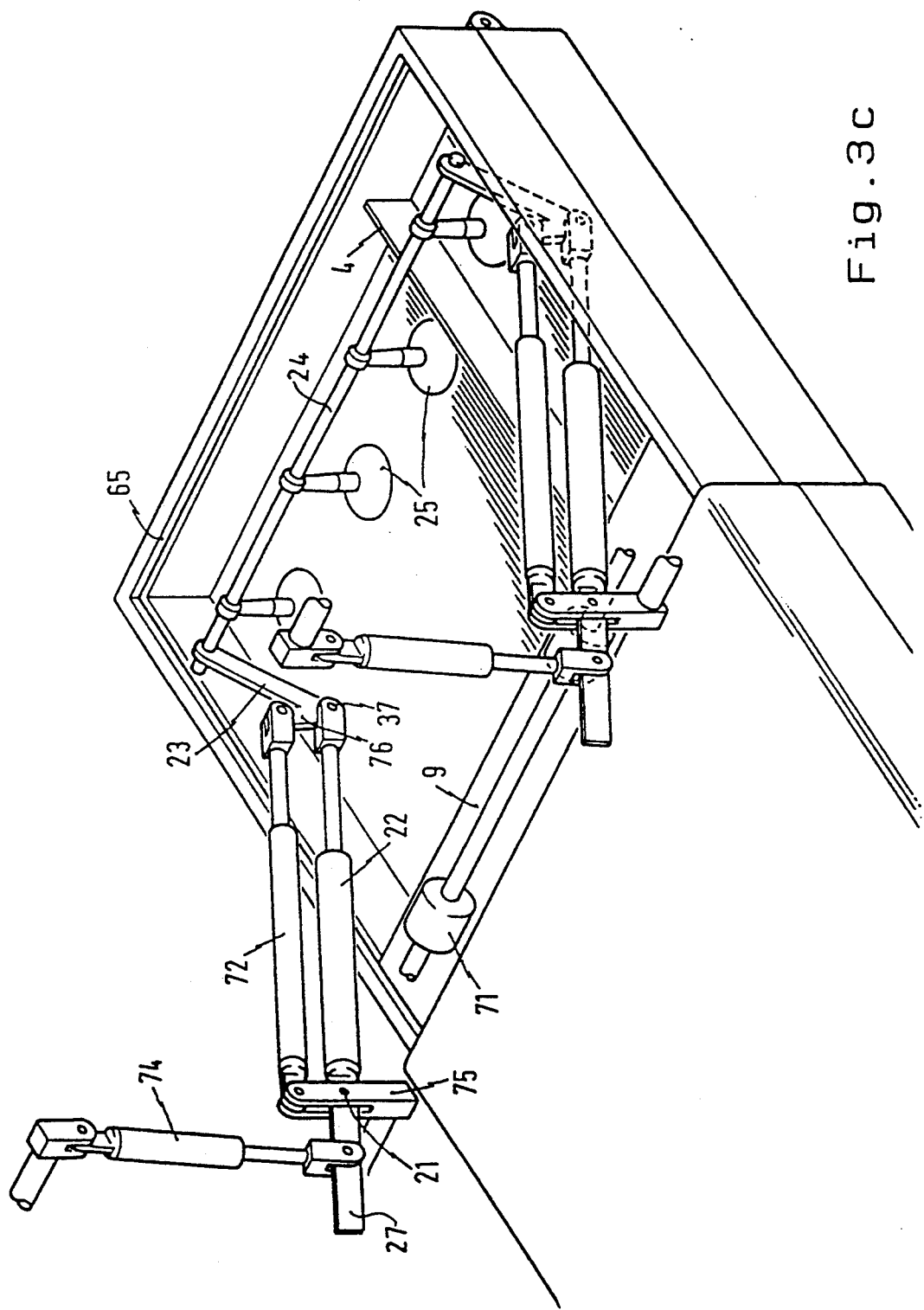

The operation of the apparatus which is shown in FIGS. 3a, 3b and 3c and embodies the structure of FIGS. 5 and 6 is as follows:

When the dark box M is properly inserted into the inlet opening 20 of the enclosure 49, the member 9 is automatically shifted to the open position by the roller 71 so that it exposes the opening 65 which affords access to the compartments 64 of the internal chamber 63. Movement of the exposing-sealing member 9 to open position can also be initiated by a signal from the control unit 35 which, in turn, receives a signal from a suitable sensor (not specifically shown) serving to detect a properly inserted dark box M in the inlet opening 20. A signal from the control unit 35 thereupon causes the units 74 to initiate a pivotal movement of members 22 about the axes of the respective shafts 21 and, if necessary, a pivotal movement of levers 23 at 37 so that the suction cups 25 leave the phantom-line positions of FIGS. 3a and 3b and descend into the dark box M to (solid-line) positions of registry with the respective depressions 11 in the inner side of the housing section 1. The aforementioned parallel motion mechanism 22, 72, 75, 76 ensures that the orientation of suction cups 25 remains unchanged during descent into the dark box M. The next step involves pivoting of the suction cups 25 from the solid-line positions of FIG. 3a to the solid-line positions of FIG. 3b in order to reliably separate the topmost sheets 60 from the neighboring sheets 60a. This involves actuation of the units 72 which cause the suction cups 25 to pivot at 37. The units 74 are thereupon actuated again until the trips 27 reach and actuate one or more switches 70. This takes place when the thus lifted sheets 60 can be taken over by the rollers 30. The character 73 denotes in FIGS. 3a and 3b a pneumatic regulator which initiates and controls the operation of the units 22, 72, 74 (i.e., the movements of the suction cups 25) in response to signals from the control unit 35. Each suction cup 25 carries a microswitch (reference may be had to commonly owned U.S. Pat. No. 4,759,679 granted Jul. 26, 1988 to Müller) which is actuated by the uppermost sheet 60 in the respective compartment 64. Downward movement of the suction cups 25 is terminated when at least one of the just mentioned microswitches is actuated by the adjacent sheet 60. The control unit 35 then connects the suction cups 25 with a pump or with another suitable suction generating device (not shown) so that the suction cups begin to attract the adjacent uppermost sheets 60 (or at least one of these suction cups attracts the uppermost sheet 60 of the respective stack 61).

As already described above, the control unit 35 thereupon transmits a signal which causes the levers 23 to pivot about the axis of the member 37 in the direction of arrow A so that the attracted uppermost sheet or sheets 60 are at least partially extracted from the dark box M through the opening 65, and the control unit 35 thereupon transmits one or more additional signals which cause the linkage including the members 22 to manipulate the levers 23 in such a way that the leader(s) of the at least partially extracted sheet(s) 60 enters or enter the nip of the first pair of rolls 30 of the means for conveying sheets (one shown at 60A) from the suction cups 25 into the inlet 32 of the developing machine 33, i.e., toward the outlet of the enclosure 49. The developing machine 33 can be of the type known as STRUCTURIX NDTM which is distributed by the assignee of the present application.

The just described withdrawal of one or more uppermost sheets 60 involves slight flexing of the leaders of such uppermost sheets by the units 72, and this almost invariably results in separation of the flexed uppermost sheet or sheets from the sheet or sheets 60a immediately below. Introduction of the leaders of withdrawn uppermost sheets 60 into the nip of the rolls 30 can also involve a change of the length of members or units 22. FIGS. 3a and 3b show a suction cup 25 once in a phantom-line position and once by solid lines. When in the solid-line positions, the suction cups 25 are adjacent the stacks 61 of sheets 60, 60a . . . in the respective compartments 64 of the internal chamber 63 which is defined by the sections 1, 2 of the housing forming part of the dark box M. When in the phantom-line positions, the suction cups 25 are in the process of introducing the leaders of simultaneously withdrawn uppermost sheets 60 into the nip of the advancing rolls 30. FIGS. 3a and 3b further show that the effective length of the members 22 in phantom-line positions exceeds the effective length of these members in the solid-line positions.

The control unit 35 has several inputs which transmit to its signal evaluating and processing circuit a number of different signals. Thus, the control unit 35 receives signals when the suction cups 25 assume the solid-line positions of FIG. 3 and when the suction cups are thereupon connected with a suitable suction generating device. A subatmospheric pressure will develop in a suction cup 25 only if the respective compartment 64 contains at least one sheet 60 and if the suction cup is sufficiently close to such at least one sheet to prevent the inflow of air from the surrounding atmosphere above the at least one sheet. Since the height of each stack or pile 61 of sheets 60 can vary and often varies from compartment to compartment, it can happen that a first lowering of suction cups 25 from the phantom-line positions to the solid-line positions of FIGS. 3a and 3b results in the establishment of vacuum in a single suction cup or in fewer than all four suction cups. This means that the first lifting of suction cups 25 from the solid-line positions to the phantom-line positions of FIG. 3 will result in withdrawal of one, two or three sheets 60 (rather than four sheets, it being assumed here that the internal chamber 63 of the housing of the dark box M which is shown in FIGS. 3a and 3b is divided into four compartments 64 and that each such compartment contains a stack 61 of exposed but undeveloped sheets 60). The same procedure is repeated again and again, as often as necessary, until the height of all four stacks 61 is at least nearly the same. From then on, each of the four suction cups 25 lifts the uppermost sheet 60 off the respective stack 61 (i.e., from the respective compartment 64) during each movement from the solid-line position to the phantom-line position of FIG. 3.

The aforementioned microswitches which are associated with the suction cups 25 transmit to the control unit 35 signals which denote whether or not the respective suction cups have developed a vacuum upon movement to the solid-line position of FIGS. 3a and 3b. Thus, the control unit 35 can ascertain which of the suction cups 25 is about to lift a sheet 60, and the control unit 35 can transmit an advance signal to the respective ascertaining or counting device 34 of the monitoring means. For example, if the height of all four stacks 61 is the same from the very start of operation of the sheet manipulating apparatus of FIGS. 3a, 3b, 3c or after a certain number of cycles which are performed by the suction cups 25, each of the four ascertaining or counting devices 34 receives an advance signal that a sheet 60 is about to reach the nip 67 of its rotary members 40, 41. This causes the longer arms 47 of the respective levers 45 to move into the paths of radiation which is emitted by the radiation sources of the respective photoelectronic scanning devices 48. The control unit 35 receives an "error" or "defect" or "malfunction" signal if a suction cup 25 is under vacuum but the corresponding ascertaining device 34 fails to receive a sheet 60 after elapse of a certain interval of time thereafter. The detection of such "defect" signal induces the control unit 35 to start the motor or motors for the rolls 30 in reverse so that the respective sheet 60 is advanced backwards (arrow B in FIG. 3a) and is returned into the respective compartment 64. The next step involves renewed advancement of the retracted sheet 60 in the direction toward the inlet 32 of the developing machine 33.

If the arm 47 of a particular lever 45 interrupts the radiation beam for the associated photoelectronic device 48 for a short interval of time, this indicates to the control unit 35 that the respective nip 67 contains at least two superimposed or overlapping sheets 60, 60a . . . because the pin 43 of the respective ascertaining means 34 has been advanced beyond that position or beyond that level which is indicative of the presence of a single sheet 60 in the respective nip 67. In other words, the respective suction cup 25 has withdrawn two or more sheets 60, 60a . . . from the respective stack 61 in a single stage of its operation (movement from the solid-line position to the phantom-line position of FIG. 3a or 3b). This, too, induces the control unit 35 to reverse the direction of rotation of the rolls 30 in order to return the sheets 60 into the respective compartments 64, and to thereupon again drive the rolls 30 in a direction to advance sheets 60 toward the inlet 32 of the developing machine 33. Furthermore, and particularly if the control unit 35 receives a certain number of "defect" signals which denote that one or more suction cups 25 have lifted two or more sheets 60, 60a . . . in a single withdrawing step, the control unit 35 can slow down the withdrawing operation or it can slow down one or more selected stages of the withdrawing operation in order to provide more time for separation of (flexed) topmost sheets 60 from the sheets 60a immediately below them. The arrangement is such that the control unit 35 prolongs the intervals of time following pivoting of the levers 23 in directions which are indicated by the arrow A in FIGS. 3a and 3b before the members 22 are pivoted at 21 to lift the suction cups 25 to their phantom-line positions.

Alternatively or in addition, and assuming that one or more suction cups 25 exhibit a tendency to simultaneously lift two or more overlapping sheets 60, 60a . . . , the control unit 35 can cause the units 72 to change the extent of pivotal movement of the levers 23 in the direction of arrow A, i.e., to alter (preferably increase) the extent of flexing of the topmost sheets 60 which is also conducive to more reliable separation of topmost sheets from the sheets immediately below them. In accordance with a presently preferred embodiment, the control unit 35 doubles the length of intervals of time which elapse following pivoting of the levers 23 in the direction of arrow A and preceding pivoting of the members 22 in a counterclockwise direction (as viewed in FIGS. 3a and 3b). Thus, if the control unit 35 receives a signal that at least one of the suction cups 25 has lifted two or more sheets 60, 60a . . . , this control unit simply increases by 100 percent or approximately 100 percent the interval of time which elapses between pivoting of the levers 23 in the direction of arrow A and pivoting of the members 22 in a counterclockwise direction. This has been found to enormously increase the likelihood of extraction of discrete uppermost sheets 60 (without the neighboring sheets 60a). Withdrawal of a particular sheet 60 (which has been withdrawn jointly with one or more sheets 60a . . . below it) can be repeated a certain number of times (e.g., three times) so that the fourth attempt involves the retention of the leaders of uppermost sheets 60 in upwardly flexed condition for an interval of time which is four times the original interval. This has been found to practically invariably ensure withdrawal of a single sheet 60 at a time by each of the suction cups 25. If the above outlined undertakings still fail to result in proper separation of uppermost sheets 60 from the sheets 60a immediately below them, the control unit 35 is preferably designed to generate an acoustic, optical and/or other readily detectable signal which informs an attendant that she or he must gain access to the internal space of the enclosure 49 in order to pivot the housing section 2 to the open position and to manually separate the uppermost sheet 60 from the immediately following sheet 60a of each stack 61 or of that stack wherein the leaders of sheets tend to adhere to each other. This can take place when one or more sheets are damaged (e.g., torn) and are interlaced with the neighboring sheets.

When a suction cup 25 detects an empty compartment 64 or when the withdrawal of the last or lowermost sheet of a stack 61 in a particular compartment 64 is completed, such suction cup is free to descend into the respective depression or socket 11 and to draw atmospheric air through the respective passage 12. Thus, the pressure in such suction cup 25 does not drop when the suction cup is connected to the aforementioned suction generating means. When the same situation develops in connection with each and every suction cup 25, the control unit 35 generates a signal which causes closing of the exposing-sealing member 9 and ejection of the dark box M from the enclosure 49 via inlet opening 20. Alternatively, the control unit 35 can generate a signal which informs an attendant that the emptied dark box M can be withdrawn by hand.

However, and since the establishment of subatmospheric pressure in a given suction cup 25 can also take place for reasons other than exhaustion of the supply of sheets 60 in a particular compartment 64, the trips 27 of the members 22 are preferably dimensioned and positioned to actuate the respective switches 26 when all of the suction cups 25 have descended into the respective depressions 11 so that the control unit 35 again receives a signal which indicates that the dark box M which extends into the inlet opening 20 of the enclosure 49 is empty and is thus ready to be replaced with a dark box which contains one or more stacks 61 of sheets 60.

The purpose of the microswitch or microswitches 29 is to transmit signals which indicate to the control unit 35 that the suction cups 25 should be disconnected from the suction generating means (such as the aforementioned pump). The extension or extensions 28 of one or more suction cups 25 will engage the adjacent microswitch or microswitches 29 when the leaders of the withdrawn sheets 60 are located in the nip of the rolls 30 so that they can be reliably conveyed or advanced toward the inlet 32 of the developing machine 33.

The microswitch(es) 26 and/or 29 can be replaced with optoelectronic sensor means or with other suitable signal generating and transmitting means without departing from the spirit of the invention.

The internal space of the enclosure 49 preferably accommodates one or more blowers 36 or other suitable means for raising the pressure in the internal space slightly above atmospheric pressure or above the pressure in the developing machine 33. This ensures that vapors of developing solution cannot penetrate from the machine 33 into the enclosure 49 and thus cannot affect the quality of latent images on the sheets 60 which are still confined in the dark box M or are in the process of being withdrawn from the dark box to be transported toward and into the inlet 32. Furthermore, vapors which develop in the machine 33 could bring about rapid corrosion of metallic parts in the internal space of the enclosure 49.

An advantage of the apparatus which is shown in FIGS. 3a, 3b and 3c is that it can simultaneously withdraw two or more sheets from a dark box M in the inlet opening 20. This renders it possible to empty the contents of a dark box within a fraction of the time which is required by conventional feeders. The developing machine 33 can be of standard design which is capable of processing larger and smaller exposed sheets and which is equally capable of simultaneously developing two or more sheets having identical or different formats.

The monitoring means of the apparatus of FIGS. 3a, 3b and 3c can be replaced with simpler or more complex monitoring means without departing from the spirit of the invention. As a rule, it suffices to provide monitoring means whose constituents can perform the aforediscussed functions of ascertaining the presence or absence of stacks 61 and sheets 60 in the respective compartments 64 (by ascertaining the pressure in the suction cups 25), of ascertaining the number of sheets which are withdrawn by a suction cup 25 during movement from the solid-line position to the phantom-line position of FIG. 3a or 3b, and by repeating the introduction of a sheet which is the uppermost one of two or more superimposed sheets in the nip of the rolls 30.

The levers 45 of the ascertaining or counting devices 34 can be replaced with other means for actuating the respective optoelectronic devices 48. The arrangement which is shown in FIGS. 5 and 6 is preferred at this time because it is capable of ensuring that the extent of movement of the longer arm 47 relative to the optoelectronic device 48 greatly exceeds the extent of upward movement of the rotary members 41 when the nip 67 receives two or more overlapping sheets 60, 60a . . . This enhances the reliability of the ascertaining means 34. Such ascertaining means can detect the absence of a sheet 60 in the nip 67, the presence of a singel sheet 60 in the nip, or the presence of two or more sheets 60, 60a . . . in the nip.

Figure 4:
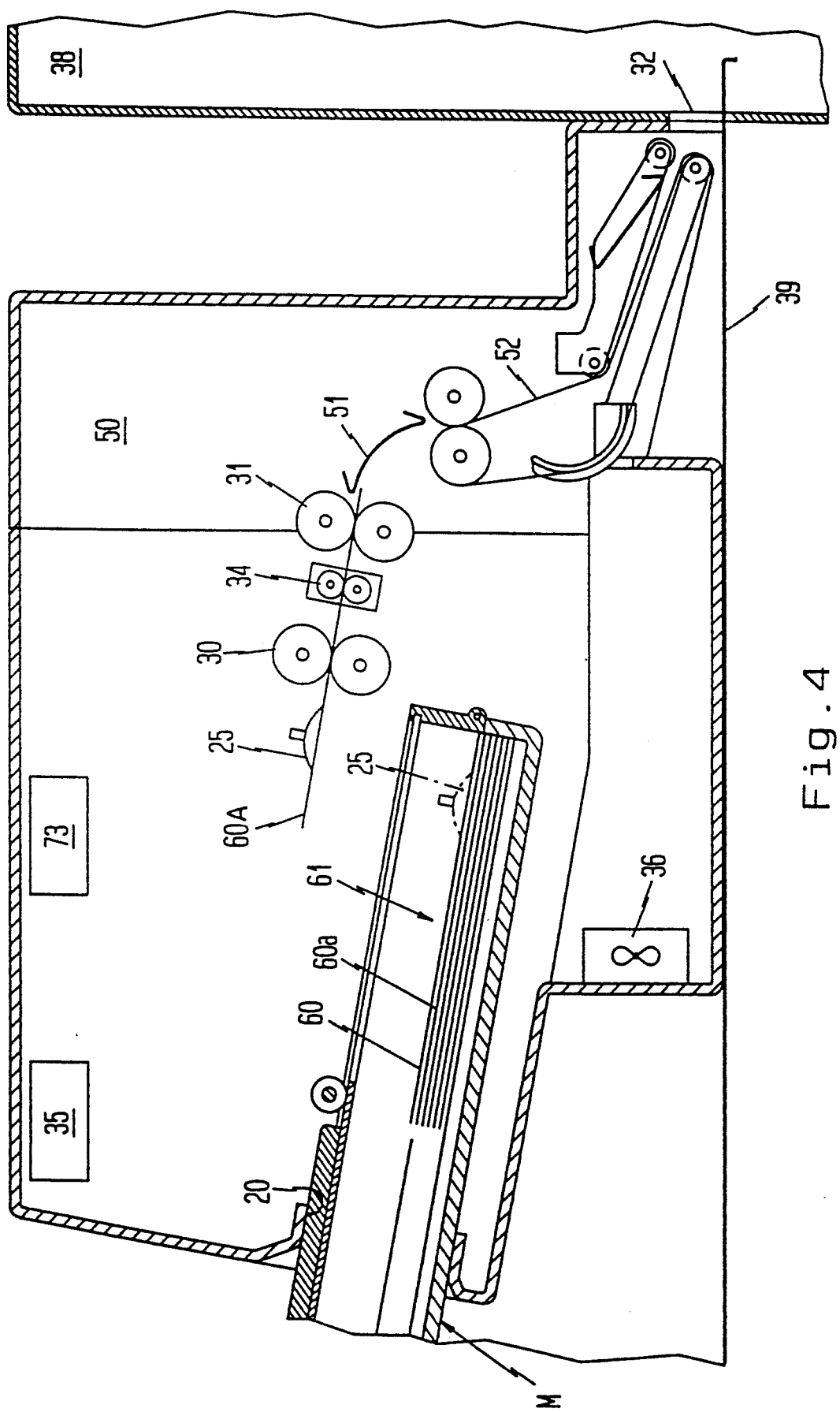
FIG. 4 is a similar partly elevational and partly sectional view of a modified apparatus which is provided with means for arraying simultaneously withdrawn sheets prior to introduction into a developing machine.

The developing machine 33 of FIGS. 3a and 3b is assumed to be capable of simultaneously processing four discrete sheets 60, i.e., the inlet 32 is long enough (as seen at right angles to the plane of FIG. 3a or 3b) to permit simultaneous passage of a number of sheets 60 (namely one sheet for each suction cup 25 except, of course, if the apparatus of FIGS. 3a and 3b is designed to employ more than one suction cup per sheet). FIG. 4 shows a modified transferring apparatus which is provided with a converting unit 50 downstream of the conveying or advancing means including the pairs of rolls 30 and 31. The unit 50 is designed to deliver simultaneously withdrawn sheets 60 into the inlet 32 of a modified developing machine 38, e.g., a machine known as STRUCTURIX NDTE which is distributed by the assignee of the present application. The machine 38 is operated in a dark chamber and includes a platform 39 immediately beneath the inlet 32. Heretofore, sheets 60 were manually fed into the inlet 32 of the machine 38 by sliding them along the platform 39. The adapter 50 automatically transfers sheets 60 from the path defined by the rollers 30, 31 onto the platform 39. The converting unit or adapter 50 comprises an arcuate deflector 51 which is located downstream of the rolls 31 and deflects sheets 60 coming from the nip of the rolls 31 onto an endless belt or chain conveyor 52 which advances the sheets onto the platform 39.

All other parts of the apparatus which is shown in FIG. 4 are or can be identical with or similar to corresponding parts of the apparatus of FIGS. 3a, 3b and 3c.

The adapter 50 enables a machine (38) of earlier vintage to receive sheets 60 from an apparatus of the type described with reference to FIGS. 3a, 3b and 3c, namely an apparatus which can simultaneously withdraw two or more identical or different sheets from a dark box M or an analogous cassette or magazine for exposed but undeveloped photosensitive material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A method of withdrawing flexible light sensitive sheets from a dark box wherein the sheets form at least one stack of superimposed sheets including an uppermost sheet and wherein at least one sheet beneath the uppermost sheet at times tends to adhere to the uppermost sheet, comprising the steps of attracting a portion of the uppermost sheet by suction to at least one pneumatic lifting device; flexing the attracted portion of the uppermost sheet above and away from the remainder of the stack to a first extent to thus promote separation of the uppermost sheet from the sheet beneath the uppermost sheet; extracting the thus attracted and flexed uppermost sheet from the dark box; monitoring the extracted uppermost sheet for the presence of one or more sheets which adhere to the extracted uppermost sheet; returning the extracted uppermost sheet and the adhering one or more sheets into the dark box upon detection of one or more adhering sheets; attracting a portion of the returned uppermost sheet by suction to the at least one pneumatic lifting device; thereupon flexing the attracted portion of the returned uppermost sheet above and away from the remainder of the stack to a different second extent; and thereupon extracting the twice flexed uppermost sheet from the dark box.

2. The method of claim 1, wherein said step of flexing the attracted portion of the returned uppermost sheet includes flexing the uppermost sheet to a greater second extent.

3. The method of claim 1 of withdrawing flexible light sensitive sheets from a dark box wherein the sheets form at least two stacks of superimposed sheets and each stack includes an uppermost sheet and at least one sheet beneath the uppermost sheet of at least one of said stacks at times tends to adhere to the respective uppermost sheet, said first attracting step including attracting at least a portion of the uppermost sheet of each of said stacks by at least one discrete pneumatic lifting device, said first flexing step comprising simultaneously flexing the attracted portions of the uppermost sheets above and away from the remainders of the respective stacks to a first extent to thus promote separation of the uppermost sheets from the sheets beneath the respective uppermost sheets, said first extracting step including extracting the thus flexed uppermost sheets from the dark box, said monitoring step comprising monitoring the extracted uppermost sheets for the presence of one or more sheets which adhere to the extracted uppermost sheets, said returning step including returning the extracted uppermost sheets and the adhering one or more sheets into the dark box upon detection of one or more adhering sheets, said second attracting step including attracting a portion of each returned uppermost sheet by the respective at least one discrete pneumatic lifting device, said second flexing step including flexing the attracted portion of each returned uppermost sheet above and away from the remainder of the respective stack to a different second extent, and said second extracting step including extracting each twice flexed uppermost sheet from the dark box.

4. The method of claim 3, wherein said second flexing step includes flexing the attracted portion of each returned uppermost sheet to a second extent greater than said first extent.

5. A method of withdrawing flexible light sensitive sheets from a dark box wherein the sheets form at least one stack of superimposed sheets including an uppermost sheet and wherein at least one sheet beneath the uppermost sheet at times tends to adhere to the uppermost sheet, comprising the steps of attracting a portion of the uppermost sheet by suction to at least one pneumatic lifting device; flexing the attracted portion of the uppermost sheet above and away from the remainder of the stack for a first interval of time to thus promote separation of the uppermost sheet from the sheet beneath the uppermost sheet; at least partially extracting the thus attracted and flexed uppermost sheet from the dark box; monitoring the extracted uppermost sheet for the presence of one or more sheets which adhere to the extracted uppermost sheet; returning the extracted uppermost sheet and the adhering one or more sheets into the dark box upon detection of one or more adhering sheets; attracting a portion of the returned uppermost sheet by suction to the at least one pneumatic lifting device; thereupon flexing the attracted portion of the returned uppermost sheet above and away from the remainder of the at least one stack for a longer second interval of time; and thereupon extracting the twice flexed uppermost sheet from the dark box.

6. The method of claim 5, wherein the duration of said second interval of time is at least approximately twice the duration of said first interval of time.

7. The method of claim 5, further, comprising the steps of monitoring the twice extracted uppermost sheet for the presence of one or more sheets which adhere to the twice extracted uppermost sheet, returning the twice extracted uppermost sheet and the adhering one or more sheets into the dark box upon detection of one or more adhering sheets, attracting a portion of the twice returned uppermost sheet by suction to the at least one pneumatic lifting device, thereupon flexing the thrice attracted portion of the uppermost sheet above and away from the remainder of the at least one stack, and thereupon extracting the thrice flexed uppermost sheet from the dark box.

8. The method of claim 7, further comprising the steps of monitoring the thrice extracted uppermost sheet for the presence of one or more sheets which adhere to the thrice extracted uppermost sheet, and generating a detectable signal upon detection of one or more sheets adhering to the thrice extracted uppermost sheet.

9. The method of claim 8, wherein said detectable signal is an acoustic signal.

10. The method of claim 8, wherein said detectable signal is an optical signal.

11. The method of claim 5, wherein said first flexing step includes flexing the attracted portion of the uppermost sheet to a first extent and said second flexing step includes flexing the attracted portion of the returned uppermost sheet to a different second extent.

12. The method of claim 11, wherein said second flexing step includes flexing the attracted portion of the returned uppermost sheet to a second extent greater than said first extent.

13. The method of claim 5 of withdrawing flexible light sensitive sheets from a dark box wherein the sheets form at least two stacks of superimposed sheets and each stack includes an uppermost sheet and at least one sheet beneath the uppermost sheet of at least one of said stacks at times tends to adhere to the respective uppermost sheet, said first attracting step including attracting at least a portion of the uppermost sheet of each of said stacks by at least one discrete pneumatic lifting device, said first flexing step comprising simultaneously flexing the attracted portions of the uppermost sheets above and away from the remainders of the respective stacks for a first interval of time to thus promote separation of the uppermost sheets from the sheets beneath the respective uppermost sheets, said first extracting step including extracting the thus flexed uppermost sheets from the dark box, said monitoring step comprising monitoring the extracted uppermost sheets for the presence of one or more sheets which adhere to the attracted uppermost sheets, said returning step including returning the extracted uppermost sheets and the adhering one or more sheets into the dark box upon detection of one or more adhering sheets, said second attracting step including attracting a portion of each returned uppermost sheet by the respective at least one discrete pneumatic lifting device, said second flexing step including flexing the attracted portion of each returned uppermost sheet above and away from the remainder of the respective stack for a longer second interval of time, and said second extracting step including extracting each twice flexed uppermost sheet from the dark box.

14. The method of claim 5, further comprising the step of introducing the twice flexed uppermost sheet into a developing machine.

* * * * *